US011475369B2

(12) United States Patent
Carranza et al.

(10) Patent No.: US 11,475,369 B2
(45) Date of Patent: Oct. 18, 2022

(54) METHODS AND APPARATUS TO PROVIDE MACHINE ASSISTED PROGRAMMING

(71) Applicant: Intel Corporation, Santa Clara, CA (US)

(72) Inventors: Marcos Emanuel Carranza, Portland, OR (US); Cesar Martinez-Spessot, Cordoba (AR); Mats Agerstam, Portland, OR (US); Maria Ramirez Loaiza, Beaverton, OR (US); Alexander Heinecke, San Jose, CA (US); Justin Gottschlich, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 664 days.

(21) Appl. No.: 16/457,365

(22) Filed: Jun. 28, 2019

(65) Prior Publication Data
US 2019/0325348 A1    Oct. 24, 2019

(51) Int. Cl.
*G06N 20/10* (2019.01)
*G06N 20/20* (2019.01)
*G06K 9/62* (2022.01)
*G06F 8/41* (2018.01)

(52) U.S. Cl.
CPC ............. *G06N 20/10* (2019.01); *G06F 8/43* (2013.01); *G06K 9/622* (2013.01); *G06K 9/6232* (2013.01); *G06N 20/20* (2019.01)

(58) Field of Classification Search
CPC .......... G06N 20/10; G06N 20/20; G06F 8/43; G06K 9/622; G06K 9/6232
See application file for complete search history.

(56) References Cited

U.S. PATENT DOCUMENTS

| | | | |
|---|---|---|---|
| 2011/0219360 A1* | 9/2011 | Srinivasa | G06F 9/44 717/124 |
| 2018/0188897 A1* | 7/2018 | Gulwani | G06F 3/0482 |
| 2019/0108001 A1* | 4/2019 | Hauser | G06F 11/3668 |

OTHER PUBLICATIONS

Lops, Pasquale et al., "Content-based Recommender Systems: State of the Art and Trends", Recommender Systems Handbook, Chapter 3, pp. 73-105, 2011,33 pages.
Irani, Jasmine et al., "Clustering Techniques and the Similarity Measures used in Clustering: A Survey", International Journal of Computer Applications, vol. 134, No. 7, Jan. 2016, 6 pages.
Comaniciu, Dorin et al., "Mean Shift: A Robust Approach Toward Feature Space Analysis", IEEE Transactions on Pattern Analysis and Machine Intelligence, vol. 24, No. 5, May 2002, 17 pages.

(Continued)

*Primary Examiner* — David F Dunphy
(74) *Attorney, Agent, or Firm* — Hanley, Flight & Zimmerman, LLC (57) ABSTRACT

Methods, apparatus, systems and articles of manufacture to provide machine assisted programming are disclosed. An example apparatus includes a feature extractor to convert compiled code into a first feature vector; a first machine leaning model to identify a cluster of stored feature vectors corresponding to the first feature vector; and a second machine learning model to recommend a second algorithm corresponding to a second feature vector of the cluster based on a comparison of a parameter of a first algorithm corresponding to the first feature vector and the parameter of the second algorithm.

25 Claims, 5 Drawing Sheets

(56) References Cited

OTHER PUBLICATIONS

Adomavicius, Gediminas et al., "Improving Aggregate Recommendation Diversity Using Ranking-Based Techniques", IEEE Transactions on Knowledge and Data Engineering, vol. 24, No. 5, May 2012, 16 pages.
Wang, Song et al., "Automatically Learning Semantic Features for Defect Prediction", ACM 38th IEEE International Conference on Software Engineering, May 14-16, 2016, 12 pages.
Arthur, David et al., "k-means++: The Advantages of Careful Seeding", Proceedings of the Eighteenth Annual ACM-SIAM Symposium on Discrete Algorithms, Jan. 7-9, 2017, 10 pages.
Fernández, Alberto et al., "Solving Non-Uniqueness in Agglomerative Hierarchical Clustering Using Multidendrograms", Journal of Classification, published online on Jun. 26, 2008, 23 pages.
Misra, Janardan et al., "Software Clustering: Unifying Syntactic and Semantic Features", 2012 19th Working Conference on Reverse Engineering, Oct. 15-18, 2012, 13 pages.
Kite, "Code Faster. Stay in Flow," Kite—Free AI Coding Assistant and Code Auto-Complete Plugin, retrieved on May 25, 2022, 9 pages.
Eclipse, "Code Recommenders The Intelligent Development Environment," published on Jun. 26, 2019, retrieved on May 25, 2022, 3 pages. [retrieved from: http://web.archive.org/web/20190626212855/http://www.eclipse.org/recommenders/].
InfoLab Standford, "The Running Time of Programs," CS109: Introduction to Computer Science, Computer Science 201, SEC. 3.3 Measuring Running Time, Jul. 1994, 72 pages. [retrieved from: http://infolab.stanford.edu/~ullman/focs/ch03.pdf].
Big-O Cheat Sheet, "Know Thy Complexities!," retrieved on May 25, 2022, 11 pages. [retrieved from: http://www.eclipse.org/recommenders/].
Venkataraman et al., "Evaluation of Inter-Process Communication Mechanisms," published 2015, 6 pages.
Hammar, "Analysis and Design of High Performance Inter-core Process Communication for Linux," Uppsala Universitet, Nov. 2014, 56 pages.
Microsoft Build, "How Windows uses the Trusted Platform Module," May 3, 2022, 16 pages.
Majumdar et al., "Adaptive Sorting Using Machine Learning," International Journal of Computer Science and Information Technologies, vol. 7 (2), 2016, 4 pages.
Trusted Computing Group, "Trusted Platform Module (TPM), 2.0: A Brief Introduction," retrieved on May 25, 2022, 3 pages. [retrieved from: https://trustedcomputinggroup.org/wp-content/uploads/TPM-2.0-A-Brief-Introduction.pdf].
Gottschlich et al., "The Three Pillars of Machine Programming," Intel Labs, MIT, May 8, 2018, 11 pages.

\* cited by examiner

METHODS AND APPARATUS TO PROVIDE MACHINE ASSISTED PROGRAMMING

FIELD OF THE DISCLOSURE

This disclosure relates generally to machine learning, and, more particularly, to methods and apparatus to provide machine assisted programming.

BACKGROUND

In recent years, machine learning and/or artificial intelligence have increased in popularity. Machine learning includes the use of models, algorithms, and/or computer systems to perform specific tasks without explicit instructions. A machine learning model can be trained (e.g., can learn) to perform the specific tasks based on feedback so that the output corresponds a desired result. Once trained, the machine learning model can make decisions to generate an output based on any input. Machine learning models are used for the emerging fields of artificial intelligence as well as other technologies.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Automation has increased the productivity of human labor taking over repetitive tasks and performing semi-supervised operations at large scale. The advent of unsupervised learning is executed with automated systems that can learn on their own, given interactions with the environment, through optimization towards a predefined reward function. Artificial intelligence may be applied to a variety of problems, from pattern recognition to prediction engines, recommendation systems and data-based analytics empower professionals in science and engineering.

As developers generate new computer programming code, developers may overlook the time, space complexity, memory consumption, security, etc. for the algorithms that they develop. For example, a developer may develop a code that has unintentional impacts when the domain input size for the algorithm increases, which may cause program crashes due to heap memory limits, program crashes due to stack overflows through a long series of function recursion invocation, program responsiveness of freezing due to an inefficient time complex algorithm, etc.

Examples disclosed herein utilizes a machine programming solver to utilize machine learning models to process generated code, determine the algorithms (e.g., methods, classes, sub-sections of code, etc.) of the code, and generate recommendations to replace one or more of the algorithms of the code with algorithms that are more efficient for a particular parameter (e.g., speed, memory, resources, security, etc.) and/or better suited for the purpose of the new code. During training, examples disclosed herein utilize feature vectors (e.g., representative of algorithms) from libraries (e.g., stored locally at the computing device or at an external computing device and/or server) and/or internal code to generate clusters of feature vectors representative of algorithms, where each cluster corresponds to a similar functionality (e.g., a sorting cluster, a transmission cluster, a searching cluster, etc.). Although the feature vectors in a cluster serve the same purpose, each algorithm corresponding to a feature vector may have different advantages and disadvantages.

Once the clusters have been developed, examples disclosed herein organize each cluster according to the advantages of the algorithms corresponding to feature vectors within a cluster. For example, the feature vector of the cluster may include documentation that identifies the best use of the corresponding algorithm and/or the parameters corresponding to the algorithm (e.g., how fast the algorithm is, the amount of processor resources needed to execute the algorithm, the memory required to execute the algorithm, the limits of the algorithm, the security level of the algorithm etc.). Additionally or alternatively, the parameters of an algorithm may be determined analytically (e.g., by processing the code of the algorithm) or by measuring the parameters while executing the algorithm. Once the parameters are known, examples disclosed herein organize feature vectors of a cluster based on efficiency of the parameters of the feature vectors.

When new code is generated, examples disclosed herein break the code can be broken into feature vectors and identify any clusters that match the feature vectors (e.g., based on a similarity determination). If a feature vector of the new code matches a cluster, exampled disclosed herein generates a recommendation for the feature vector by finding an algorithm corresponding to a feature vector of the cluster that is more efficient for a particular parameter (e.g., the parameter being identified by a user and/or being based on context data). The recommendation is provided to the user to create more efficient code that operates as the code's other intended without less possibility of program crashes or freezing.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, a cluster model and a recommender model are used. Using a cluster model enables the grouping of similar blocks of code and a recommender model enables generation of recommendations for a user. In general, machine learning models/architectures that are suitable to use in the example approaches disclosed herein could be any type of AI, ML, neural network, deep learning, etc.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.) Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, ML/AI models are trained using internal libraries (e.g., libraries included with a locally installed program) or external libraries (e.g., located on the Internet, the cloud, a server, etc.), internal code and/or new code. However, any other training algorithm may additionally or alternatively be used. In examples disclosed herein, training is performed periodically, aperiodically, or based on a trigger. In examples disclosed herein, training is performed locally (e.g., at the computer device) or externally (e.g., at a server or another device at then the trained models are deployed to the computing device). Training is performed using hyperparameters that control how the learning is performed (e.g., a learning rate, a number of layers to be used in the machine learning model, etc.).

Training is performed using training data. In examples disclosed herein, the training data originates from publicly available libraries that are located locally or remotely (e.g., on the Internet, at a server, on the cloud, etc.). Because supervised training is used, the training data is labeled. In some examples, the training data is pre-processed using, for example, feature extractor to convert code into vectors representative of some or all of the code.

Once training is complete, the model is deployed for use as an executable construct that processes an input and provides an output based on the network of nodes and connections defined in the model. The model may be stored locally or remotely. The model may then be executed by the machine learning models.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

Figure 1:
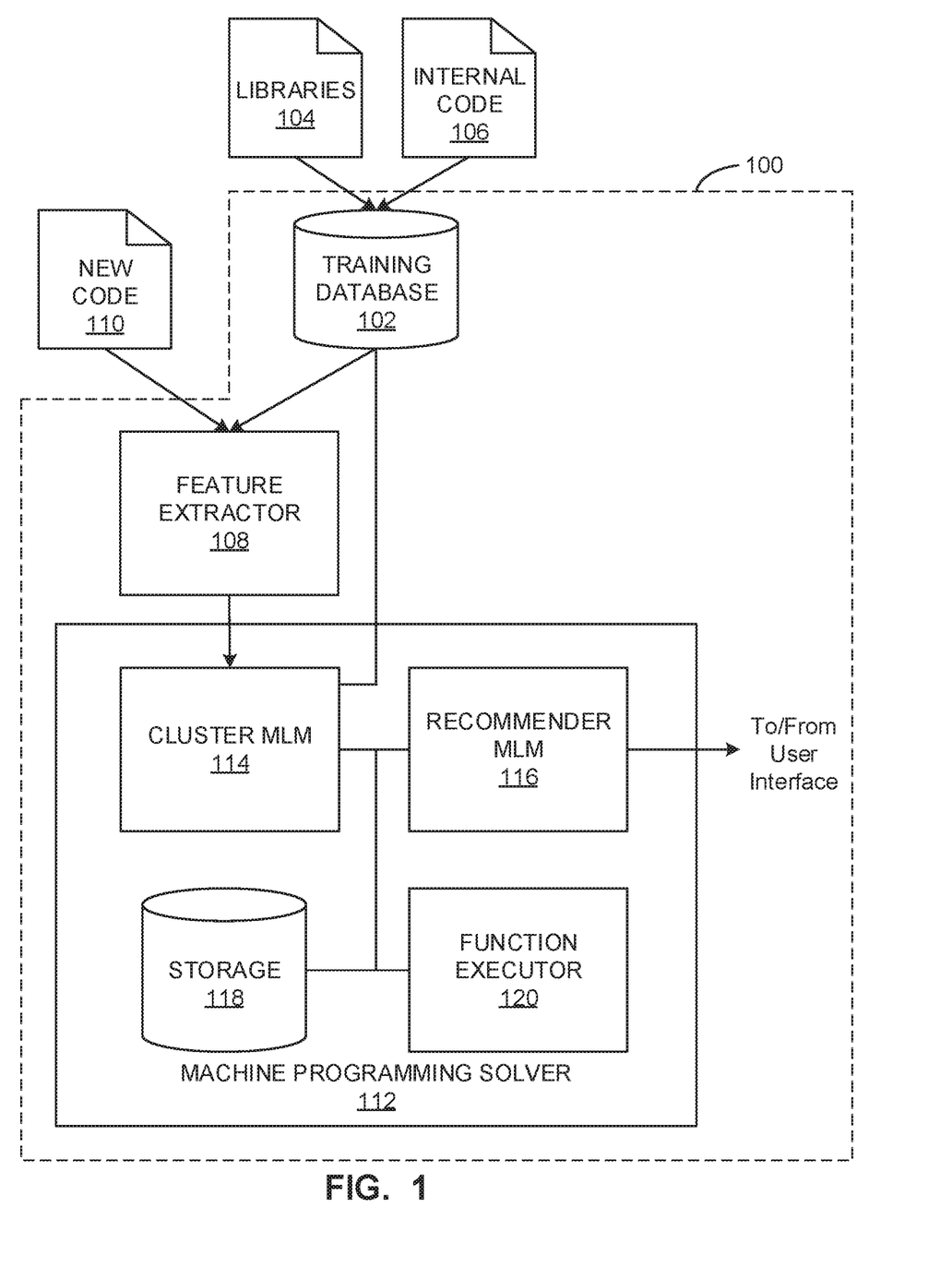
FIG. 1 is a block diagram of an example computer device providing machine assisted programming.

FIG. 1 illustrates an example computing device 100 providing machine assisted programming. The example computing system 100 includes an example training database 102 receiving example libraries 104 and example internal code 106, an example feature extractor 108 receiving example new code 110, and an example machine programming solver 112. The example machine programming solver 112 includes an example cluster machine learning modem (MLM) 114, an example recommender MLM 116, example storage 118, and an example function executor 120. Although the example computing system 100 includes the example training database 102, the example feature extractor 108, and the example machine programming solver 112 in the same computing system 100, one or more of the example training database 102, the example feature extractor 108, and/or the example machine programming solver 112 may be located remotely from the computing system 100 and may communicate via a wired or wireless communication.

The example training database 102 of FIG. 1 stores blocks of code (e.g., methods, functions, algorithms, classes, etc.). The blocks of code may be provided by the example libraries 104, internal code 106, and/or parts of new code that does not correspond to a cluster. The libraries 104 may be libraries of code local to the processing device and/or may be libraries found outside of the processing device (e.g., on the Internet, in the cloud, at a server, etc.). The internal code 106 may be internal repositories (e.g., git repositories) with optimized implementation, internal documentation (e.g., apache libraries), etc. stored within the processing device. The blocks of code may optimize one or more particular aspects (e.g., speed, memory, resources, security, etc.) and/or are beneficial in particular contexts (e.g., code that implements technology best suited to be used in a particular context), as based on labels corresponding to the associated documentation to determine the purpose or category of the code. Additionally, the training database 102 may store newly generated code (e.g., provided by the machine programming solver 112) that does not correspond to a cluster in the training database 102. In some examples, the blocks of code are stored in conjunction with functionality, performance data, and/or contextual data (e.g., if known). For example, the training database 102 may include a block of code corresponding to a searching function. Additionally, the block of code may be stored in the training database 102 in conjunction with the amount of resources needed to perform the searching function, the amount of memory needed to perform the searching function, the speed and/or efficiency of performing the searching function, the security of performing the searching function, etc. Such information may be provided by the creator of the block of code and/or a prior analysis of the block of code. The blocks of code stored in the example training database 102 are used to train the example machine programming solver 112, as further described below. The example training database 102 may be located locally at the processing device and/or may be located remotely (e.g., in the cloud, at a server, etc.).

The example feature extractor 108 of FIG. 1 extracts features from blocks of code in the training database 102 and/or based on newly written code 110. For example, periodically, aperiodically, and/or based on a trigger (e.g., when new data has been added to the example training database 102), the example feature extractor 108 may extract features from the block(s) of code stored in the example training database 102 to update the example cluster MLM 114 and/or the example recommender MLM 116 based on new training data stored in the example training database 102. The example feature extractor 108 uses the extracted features to convert a block of code into one or more feature vectors representative of the one or more features of the block of code. For example, a small block of code may be converted into a single feature vector representative of the block of code and a large block of code may be converted into multiple feature vectors representative of the block of code as a whole, parts of the code (e.g., methods, classes, etc.), subparts of the code (e.g., one or more lines of code within a part of the code), etc. When the feature extractor 108 receives the example new code 110 (e.g., code that has just been written and successfully compiled without error), the example feature extractor 108 converts the new code 110 into one or more features representative of the block of code as a whole, parts of the code, subparts of the code, etc. The example feature extractor 108 transmits the feature-based vector representation of blocks, part, and/or subparts of code to the example machine programming solver 112.

During training, the example cluster MLM 114 of FIG. 1 receives the feature vectors (e.g., representative of a block of code of the new code) from the example feature extractor 108 and includes the feature into an established cluster of similar feature vectors (e.g., representative of blocks of each of code from the training database 102) or generates a new cluster for new feature vectors that do not correspond to an established cluster. For example, the cluster MLM 114 may generate a sorting cluster for feature vectors corresponding to sorting algorithms, a searching cluster for feature vectors corresponding to searching algorithms, a transmission cluster for feature vectors corresponding to transmission algorithms, etc. During training, the cluster MLM 114 learns the number of generated clusters, the centroids of the clusters, and/or a hierarchy of each cluster based on the training data. The example cluster MLM 114 may be implemented using k-means clustering, mean shift clustering, agglomerative hierarchical clustering, and/or any other type of clustering. During training, the cluster MLM 114 calculates training feature vectors and cluster assignments of the initial training data.

When the new code 110 is obtained and converted into feature vector(s), the example cluster MLM 114 of FIG. 1 associates the new feature vector(s) to a particular cluster(s) and passes the corresponding cluster(s) to the example recommender MLM 116. In this manner, the example recommender MLM 116 can make recommendations to a user based on the corresponding cluster. The example cluster MLM 114 may associate the new feature vector(s) to particular cluster(s) by performing a similarity measure between the feature vector(s) of the new code 110 and feature vectors of the cluster. The similarity measure can be any pair-wise measure (e.g., a Euclidean distance, cosine similarity, etc.). If the example cluster MLM 114 determines that one or more of the feature vectors of the new code 110 does not correspond to a cluster (e.g., the similarity measurement does not satisfy a threshold), the cluster MLM 114 transmits the feature to the example training database 102 to be used to train the example cluster MLM 114 at a later point in time.

During training, the example recommender MLM 116 of FIG. 1 organizes the feature vectors of a cluster according to the efficiency of one or more parameters or context information. For example, the recommender MCM 616 may generate a similarity matrix based on the clusters. The example recommender MLM 616 may be implemented using a content-based method, a collaborative filtering method, and/or any other known recommender system. In a content-based implementation, the example recommender MLM 116 may maintain a similarity matrix for each cluster of the training data calculated during training. The similarity matrix includes performance and/or contextual ratings for each feature of a cluster. In an item-based collaborative filtering implementation, the example recommender MLM 116 recommends optimized code blocks that are similar to the current method or the suggest code blocks that were accepted by other programmers for similar code. If contextual and/or performance information for a particular feature is not known (e.g., because it was not provided in documentation or provided from a user) during training, the example recommender MLM 116 may process the feature analytically to determine the contextual and/or performance data. If contextual data and/or performance data cannot be determined analytically, the example function executor 120 may instruct the example function executor 120 to execute the feature while the example recommender MLM 116 analyses the execution of the function to determine contextual and/or performance data corresponding to the feature.

When the example new code 110 is received, the example recommender MLM 116 of FIG. 1 provides recommendations to the user for one or more algorithms of the new code 110 based on the similarity matrix (e.g., generated during training) corresponding to the identified cluster. The recommendation is based on parameters to be optimized (e.g., speed, memory, resources, security, context, etc.). The parameters to be optimized may be based on user preferences and/or context data, such as current processor status (e.g., if the processor currently has limited memory, memory may become the parameter to be optimized or if the program manages sensitive data security may become the parameter to be optimized). In some examples, the recommender MLM 116 generates a recommendation based on context data corresponding to an inter process communication mechanism (IPCM), input outputs (I/O), graphics, mathematical ops, security services, etc. IPCMs include local network connections (e.g., user datagram protocol (UDP)/transmission control protocol (TCP) sockets), mailboxes, named pipes, shared memory, remote procedure calls (RPC) and/or other high level abstraction services for communication including different paradigms (e.g., RESTful, pub/sub, etc.), proxy services (e.g., d-bus), etc. Each of the IPCMs may be preferential for different parameters (e.g., security, latency, bandwidth, complexity, robustness, portability, etc.). Accordingly, the example recommender MLM 116 can make recommendations based on insights as to the usage of the PCMs through runtime monitoring (e.g., number of producers, consumers, frequency of communication, data sizes, stream v. message based communication, etc.). The recommender MLM 116 may display the recommendation of the algorithm corresponding to the recommended feature vector to a user via a user interface in a ranked or unranked order. Additionally, the recommender MLM 116 may update organization of recommendation (e.g., the similarity matrix) based on feedback from the user. For example, if a user selects one or more of the recommendations, the recommender MLM 116 can apply a larger weight to those recommendations for further recommendations.

In some examples, the example cluster MLM 114 and/or the example recommender MLM 116 are trained external from the example computer system 100. For example, the cluster MLM 114 and/or the example recommender MLM 116 are trained on the cloud, at a server, and/or on an external device. In such examples, the trained cluster MLM and/or the trained recommender MLM can be deployed to the example machine programming solver 112 via a wired or wireless communication.

The example storage 118 of FIG. 1 stores the functions, the function clusters and/or hierarchy and the recommendation organization (e.g., the similarity matrix). When additional training occurs, the data stored in the example storage 118 may be updated to reflect the updated functions, clusters, hierarchy, and/or similarity matrix.

While an example manner of implementing the computing system 100 is illustrated in FIG. 1, one or more of the elements, processes and/or devices illustrated in FIG. 1 may be combined, divided, re-arranged, omitted, eliminated and/or implemented in any other way. Further, the example feature extractor 108, the example cluster MLM 114, the example recommender MLM 116, the example function executor 120, and/or, more generally, the example computing system 100 of FIG. 1 may be implemented by hardware, software, firmware and/or any combination of hardware, software and/or firmware. Thus, for example, any of the example feature extractor 108, the example cluster MLM 114, the example recommender MLM 116, the example function executor 120, and/or, more generally, the example computing system 100 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example feature extractor 108, the example cluster MLM 114, the example recommender MLM 116, the example function executor 120, and/or, more generally, the example computing system 100 of FIG. 1 is/are hereby expressly defined to include a non-transitory computer readable storage device or storage disk such as a memory, a digital versatile disk (DVD), a compact disk (CD), a Blu-ray disk, etc. including the software and/or firmware. Further still, the example computing system 100 of FIG. 1 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 2:
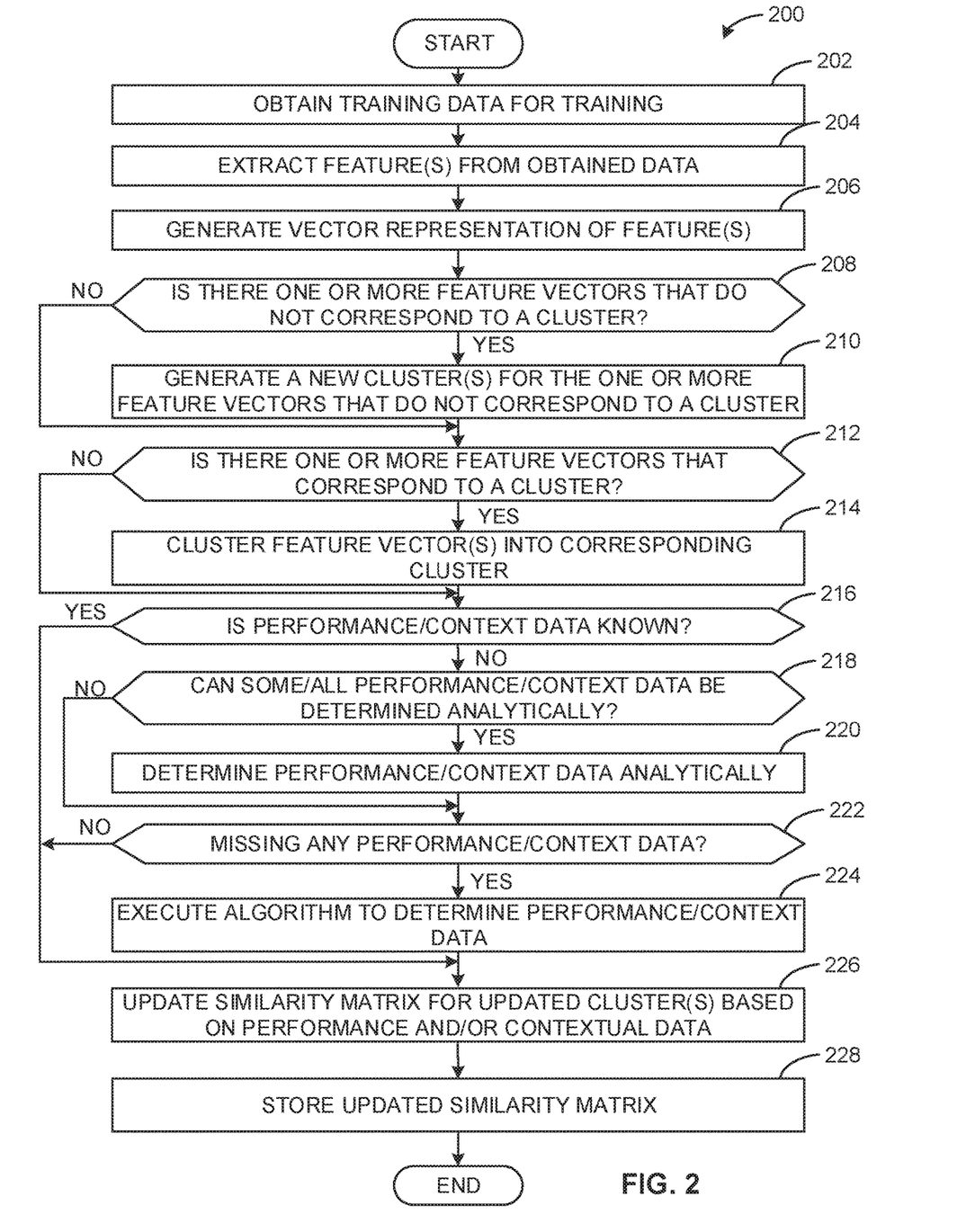
FIG. 2 is a flowchart representative of example machine readable instructions which may be executed to implement the example computer device of FIG. 1 to train the example machine programming solver of FIG. 1.
Figure 3A:
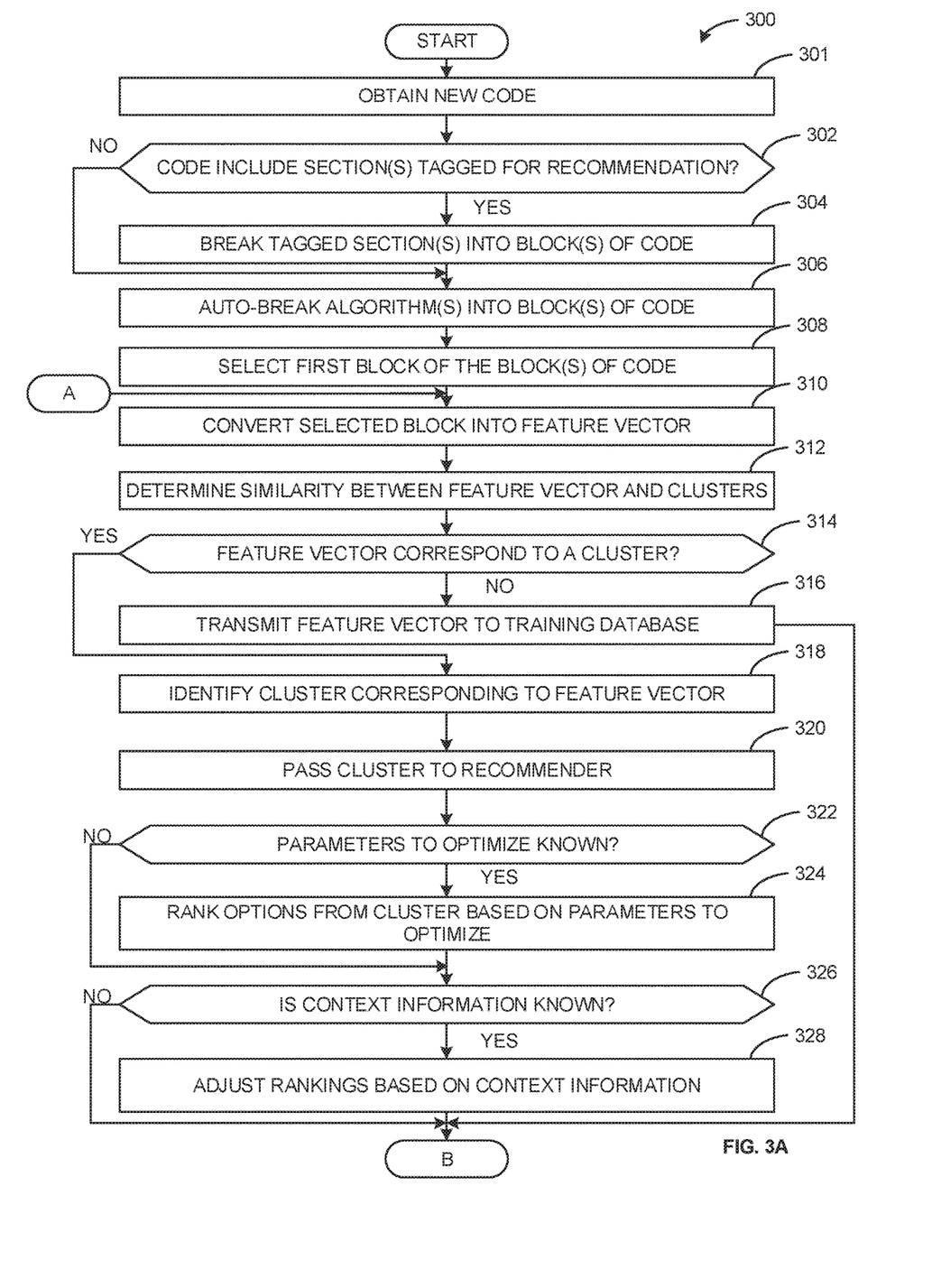
FIGS. 3A-3B is a flowchart representative of example machine readable instructions which may be executed to implement the example computer device of FIG. 1 to provide machine assisted programming.
Figure 3B:
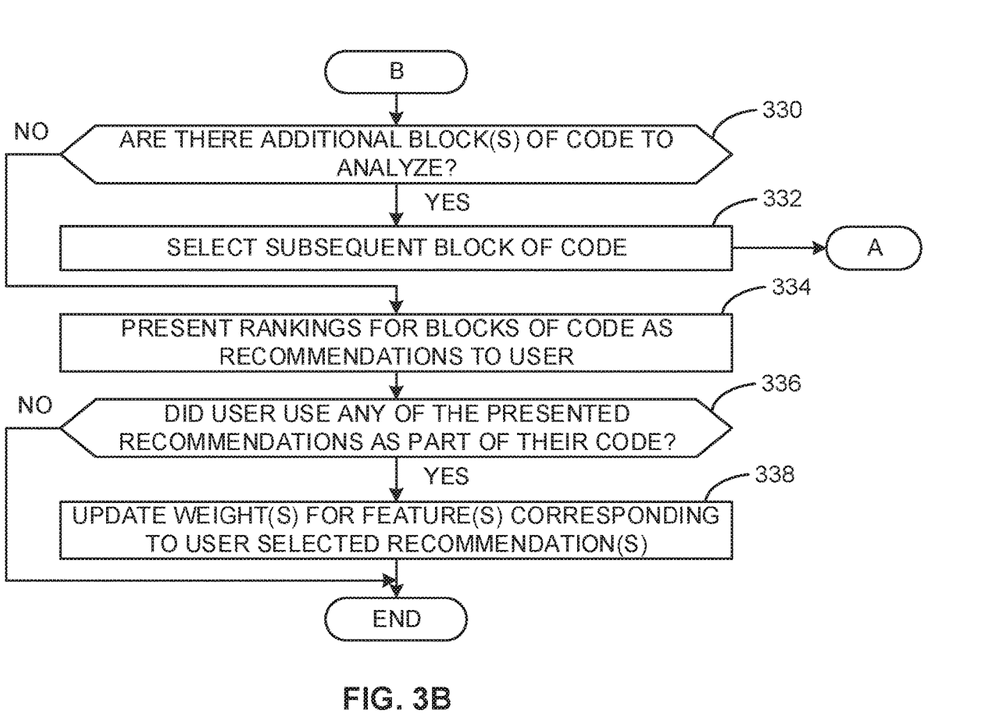

Flowcharts representative of example hardware logic, machine readable instructions, hardware implemented state machines, and/or any combination thereof for implementing the example computing system 100 are shown in FIGS. 2 and 3A-3B. The machine readable instructions may be one or more executable programs or portion(s) of an executable program for execution by a computer processor such as the processor 412 shown in the example processor platform 400 discussed below in connection with FIG. 4. The program may be embodied in software stored on a non-transitory computer readable storage medium such as a CD-ROM, a floppy disk, a hard drive, a DVD, a Blu-ray disk, or a memory associated with the processor 412, but the entire program and/or parts thereof could alternatively be executed by a device other than the processor 412 and/or embodied in firmware or dedicated hardware. Further, although the example program is described with reference to the flowcharts illustrated in FIGS. 2 and 3A-3B, many other methods of implementing the example computing system 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 2 and 3A-3B may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 2 is an example flowchart 200 representative of example machine readable instructions which may be executed to implement the example computing system 100 of FIG. 1 to train the example cluster MLM 114 and the example recommender MLM 116 to be able to provide machine assistant programming to a user.

At block 202, the example the example feature extractor 108 obtains training data for training. The training data may algorithms, methods, classes, and/or other blocks of code from stored in the example training database 102. The training data may be from the example libraries 104 (e.g., remote or local), the example internal code 106, and/or may be part of the new code 110 that was flagged by the cluster MLM 114 as not being similar to any existing cluster.

At block 204, the example feature extractor 108 extracts feature(s) from the obtained training data. However, the example feature extractor 108 may perform different types of transmissions for different feature representations (e.g., to account for the model implementation). The features may represent an entire algorithm or part of an algorithm (e.g., a block, subblock, function, line, class, etc.). At block 206, the example generates a vector representation of the feature(s) to provide to the example cluster MLM 114. For example, the feature extractor 108 may use a one-hot-encoding technique for categorical feature representations to generate one or more vector representations of features of the obtained data. The vector representation allows for the machine programming solver 112 to be able to interpret and/or process the data.

At block 208, the example cluster MLM 114 determines if there is one or more of the feature vector(s) that does not correspond to a cluster. For example, the cluster MLM 114 may perform a similarity measure (e.g., a Euclidean distance, cosine similarity, etc.) between the feature vector(s) and the established clusters. If the example cluster MLM 114 determines that there are not one or more feature vectors that do not correspond to a cluster (block 208: NO), control continues to block 212. If the example cluster MLM 114 determines that there are one or more feature vectors that do not correspond to a cluster (block 208: YES), the example cluster MLM 114 generates a new cluster(s) for the one or more feature vector(s) that do not correspond to a current cluster (block 210). The new cluster is stored in the example storage 118.

At block 212, the example cluster MLM 114 determines if there is one or more of the feature vectors that corresponds to a cluster. If the example cluster MLM 114 determines that there is not one or more feature vectors that corresponds to a cluster (block 208: NO), control continues to block 216. If the example cluster MLM 114 determines that there is one or more feature vectors that do corresponds to a cluster (block 208: YES), the example cluster MLM 114 clusters the feature vectors into the corresponding cluster(s) and/or cluster-based hierarchy(ies) of features (block 214). For example, if the cluster MLM 114 determines that one of the feature vectors corresponds to a sorting algorithm, the cluster MLM 114 will include the feature with a cluster of feature vectors corresponding to sorting algorithms. The example cluster MLM 114 stores the updated and/or new clusters in the example storage 118 and provides the updated and/or new clusters to the example recommender MLM 116.

At block 216, the example recommender MLM 116 is determines if performance and/or context data is known for the new feature of the cluster. For example, the algorithm corresponding to the feature vector may include documentation that identifies performance data (e.g., the heat memory, speed, resources required, amount of memory, cache, or stack used, security, etc.) and/or context data (e.g., in what circumstances, technology, etc. is the function best used in conjunction with). If the performance and/or context data is known (block 216: YES), control continues to block 226. If some or all of the performance and/or context data is not known (block 216: NO), the example recommender MLM 116 determines if some and/or all of the performance and/or context data can be determined analytically (e.g., by processing the code itself without actually executing the code) (block 218).

If the example recommender MLM 116 determines that some and/or all of the performance and/or context data cannot be determined analytically (block 218: NO), control continues to block 222. If the example recommender MLM 116 determines that some and/or all of the performance and/or context data can be determined analytically (block 218: YES), the example recommender MLM 116 determines the performance/contextual data analytically by processing the feature vector (block 220). At block 222, the example recommender MLM 116 determines if any performance and/or context data is still missing.

If the example recommender MLM 116 determines if some performance and/or context data is not still missing (block 222: NO), control continues to block 226. If the example recommender MLM 116 determines if some performance and/or context data is still missing (block 222: YES), the example recommender MLM 116 instructs the function executor 120 to execute the algorithm corresponding to the feature vector and the example recommender MLM 116 and/or the example function executor 120 determines the performance and/or context data based on the execution of the algorithm (block 224).

At block 226, the example recommender MLM 116 updates the similarity matrix (or other type of recommendation organization) for the updated cluster(s) based on the performance and/or contextual data of the newly added feature vector. For example, if the similarity matrix ranks algorithm corresponding to the feature vectors of the cluster according to particular performance metrics and/or contextual metrics, the example recommender MLM 116 adjusts the rankings based on the performance and/or contextual data of the new algorithm. At block 228, the example recommender MLM 116 stores the updated similarity matrix in the example storage 118. In this manner, when new code is obtained, the example recommender MLM 116 can make recommendations to the user for parts of the new code based on the updated similarity matrix.

FIGS. 3A-3B illustrate an example flowchart 300 representative of example machine readable instructions which may be executed to implement the example computing system 100 of FIG. 1 to provide machine assistant programming to a user.

At block 301, the example feature extractor 108 obtains the example new code 110. As described above in conjunction with FIG. 1, the new code 110 may be code generated by a user that has been successfully compiled without errors. At block 302, the example feature extractor 108 determine is if the new code 110 includes section(s) that have been tagged by a user for recommendation. For example, before or after successful compilation of code, the user may tag a section of the code for recommendations. In this manner, the example machine programming solver 112 can provide recommendations corresponding to the tagged section of code.

If the example new code 110 does not include sections(s) tagged for recommendation (block 302: NO), control continues to block 306. If the example new code 110 includes sections(s) tagged for recommendation (block 302: YES), the example feature extractor 108 breaks the tagged section(s) into block(s) of code (block 304). At block 306, the example feature extractor 108 automatically breaks different algorithms of the new code 110 into block(s) of code. The algorithms could be the entire code, a section of the code (e.g., a part of the entire code, a class, a method, etc.), a subsection of the code (e.g., a function within the code and/or one or more lines of code within the entire code, the class, the method, etc.), etc. At block 308, the example feature extractor 108 selects a first block of the block(s) of code. At block 310, the example feature extractor 108 converts the selected block into a feature vector (e.g., representative of the selected block of code that can be processed by the example machine programming solver 112).

At block 312, the example cluster MLM 114 determines the similarity between the feature vector and the clusters developed during training. For example the cluster MLM 114 may determine a similarity using a Euclidean distance, a cosine similarity, etc. At block 314, the example cluster MLM 114 determines if the feature vector corresponds to a cluster. For example, if the example cluster MLM 114 determines that the feature vector is similar to one of the clusters (e.g., based on a threshold amount of similarity), the cluster MLM 114 determines that the feature vector corresponds to the cluster. If the example cluster MLM 114 determines that the feature vector is not similar to any of the clusters, the example cluster MLM 114 determines that the feature vector does not correspond to a cluster. If the example cluster MLM 114 determines that the feature vector does not correspond to a cluster (block 314: NO), the example cluster MLM 114 transmits the feature vector to the training database 102 of FIG. 1 (block 316). In this manner, the feature can be used to train the example machine programming solver 112 at a later point in time. In some examples, the example cluster MLM 114 generates a new cluster when the feature vector does not correspond to a cluster.

If the example cluster MLM 114 determines that the feature corresponds to a cluster (block 314: YES), the example cluster MLM 114 identifies the cluster that corresponds to the feature vector (e.g., the cluster that is most similar to the feature vector) (block 318). At block 320, the example cluster MLM 114 passes the cluster to the example recommender MLM 116. At block 322, the example recommender MLM 116 determines if the parameters to optimize are known. For example, the user may have provided one or more parameters (e.g., speed, efficiency, memory consumption, security, robustness, etc.) that the user desires to optimize. If the example recommender MLM 116 determines if the parameters to optimize are not known (block 322: NO), control continues to block 326. If the example recommender MLM 116 determines if the parameters to optimize are known (block 322: YES), the example recommender MLM 116 ranks options (e.g., feature vectors corresponding to algorithms stored in the example storage 118) from the cluster corresponding to the feature vector based on the parameter(s) to be optimize (block 324). For example, if the parameters to be optimize are speed and security, the example recommender MLM 116 ranks algorithms in the cluster based on speed, security, and/or a combination of speed and security.

At block 326, the example recommender MLM 116 determines if context information is known. The context information may be related to the purpose of the new code 110, the technology used with the new codes 110, and/or the availability of processor resources, memory, and/or any other current characteristic(s) of the example computing system 100. For example, the recommender MLM 116 may process the new code 110 to look at the semantics of what the example is trying to do with respect to a particular technology and/or may look at the current availability of resources to determine if a particular algorithm more appropriately performs the same or a substantially similar function to one or more algorithms of the new code 110. If the example recommender MLM 116 determines that context information is not known (block 326: NO), control continues to block 330 of FIG. 3B. If the example recommender MLM 116 determines that context information is known (block 326: YES), the example recommender MLM 116 adjusts the rankings for block based on the context information (block 328). For example, the recommender MLM 116 may more heavily weigh feature vectors of the cluster that are optimized and/or correspond more closely to the context information.

At block 330 of FIG. 3B, the example feature extractor 108 determines if there is an additional block of the new code 110 to analyze (e.g., process to convert into a feature vector). In some examples, the feature extractor 108 converts all block(s) of code at one point in time and transmits the vectors (e.g., separately or together as a matrix) to the example machine programming solver 112 for processing. If the example feature extractor 108 determines that there are additional block(s) of code to analyze (block 330: YES), the example feature extractor 108 selects one of the subsequent block(s) of code (block 332) and control returns to block 310 of FIG. 3A. If the example feature extractor 108 determines that there are not additional block(s) of code to analyze (block 330: NO), the example recommender MLM 116 instructs a user interface to present the rankings for the blocks of code corresponding got he ranked feature vectors as recommendations to the user (block 334). In some examples, another device may convert the ranked features into the blocks of code to display to the user.

In some examples, the ranking correspond to the code that satisfy the parameters to optimize and/or the context information. For example, if the user has selected speed to be optimized and the contextual information identifies that the availability of memory is low and that there are alternatives that are more efficient with respect to what the user is attempting to do (e.g., a particular communication protocol), the example recommender MLM 116 may display alternative options for part of the new code 110 that is fastest, most memory efficient, and/or more efficient with respect to what the user is attempting to do. Additionally, the example recommender MLM 116 may identify X or more alternative options that satisfy one or more of the parameters to be optimized and/or the context information.

At block 336, the example recommender MLM 116 determines if the user used any of the presented recommendation to replace part of the new code 110. If the example recommender MLM 116 determines that the user has not used any of the presented recommendation to replace part of the new code 110 (block 336: NO), control ends. If the example recommender MLM 116 determines that the user has used any of the presented recommendation to replace part of the new code 110 (block 336: YES), the example recommender MLM 116 updates the weight(s) and/or rankings of the stored similarity matrix (or other recommendation organization) for the feature vector(s) of a cluster corresponding to the user selected recommendation(s) (block 338).

Figure 4:
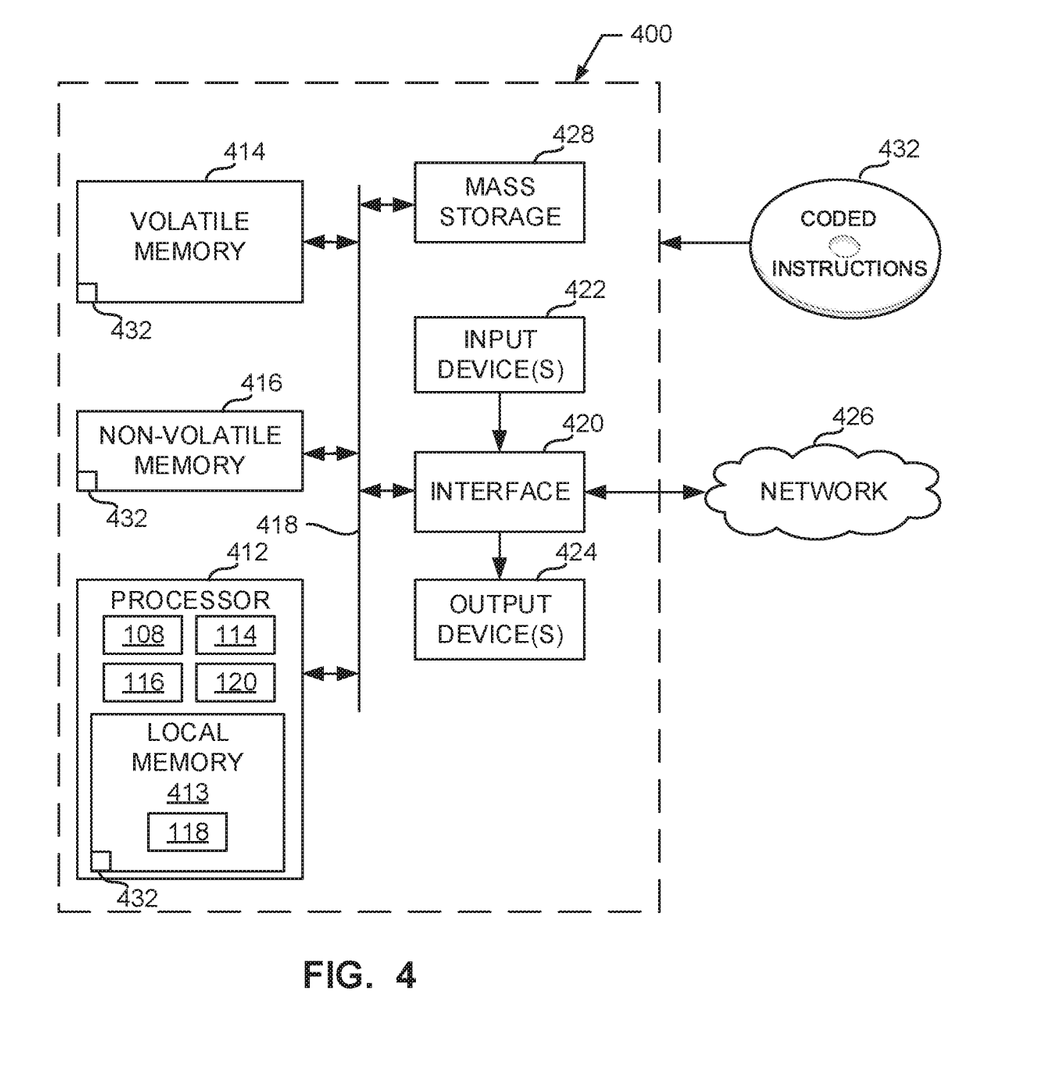
FIG. 4 is a block diagram of an example processing platform structured to execute the instructions of FIGS. 2, 3A, and/or 3B to implement the example computer device of FIG. 1.

FIG. 4 is a block diagram of an example processor platform 400 structured to execute the instructions of FIGS. 2, 3A, and/or 3B to implement the example computing device 100 of FIG. 1. The processor platform 400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 400 of the illustrated example includes a processor 412. The processor 412 of the illustrated example is hardware. For example, the processor 412 can be implemented by one or more integrated circuits, logic circuits, microprocessors, GPUs, DSPs, or controllers from any desired family or manufacturer. The hardware processor may be a semiconductor based (e.g., silicon based) device. In this example, the processor the example feature extractor 108, the example cluster MLM 114, the example recommender MLM 116, and the example function executor 120 of FIG. 1.

The processor 412 of the illustrated example includes a local memory 413 (e.g., a cache). The processor 412 of the illustrated example is in communication with a main memory including a volatile memory 414 and a non-volatile memory 416 via a bus 418. The volatile memory 414 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 416 may be implemented by flash memory and/or any other desired type of memory device. Access to the main memory 414, 416 is controlled by a memory controller.

The processor platform 400 of the illustrated example also includes an interface circuit 420. The interface circuit 420 may be implemented by any type of interface standard, such as an Ethernet interface, a universal serial bus (USB), a Bluetooth® interface, a near field communication (NFC) interface, and/or a PCI express interface.

In the illustrated example, one or more input devices 422 are connected to the interface circuit 420. The input device(s) 422 permit(s) a user to enter data and/or commands into the processor 412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 424 are also connected to the interface circuit 420 of the illustrated example. The output devices 424 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, and/or speaker. The interface circuit 420 of the illustrated example, thus, typically includes a graphics driver card, a graphics driver chip and/or a graphics driver processor.

The interface circuit 420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 426. The communication can be via, for example, an Ethernet connection, a digital subscriber line (DSL) connection, a telephone line connection, a coaxial cable system, a satellite system, a line-of-site wireless system, a cellular telephone system, etc.

The processor platform 400 of the illustrated example also includes one or more mass storage devices 428 for storing software and/or data. Examples of such mass storage devices 428 include floppy disk drives, hard drive disks, compact disk drives, Blu-ray disk drives, redundant array of independent disks (RAID) systems, and digital versatile disk (DVD) drives.

The machine executable instructions 432 of FIGS. 2, 3A, and/or 3B may be stored in the mass storage device 428, in the volatile memory 414, in the non-volatile memory 416, and/or on a removable non-transitory computer readable storage medium such as a CD or DVD.

From the foregoing, it will be appreciated that example methods, apparatus and articles of manufacture have been disclosed that provide machine assisted programming. During training, examples disclosed herein generate clusters of similar features that correspond to best methods for the features with respect to one or more parameters and/or context. In this manner, when a user generates new code, examples disclosed herein can break the code into blocks of code and determine if there is a cluster that corresponds to one or more of the blocks of code. If a cluster is available, examples disclosed herein provide recommendations of other type of code that can replace the new code to optimize one or more particular parameters. Additionally, examples disclosed herein, during implementation of machine learning models, create more efficient code that results in more efficient use of computer resources (e.g., faster, less resources used, more secure operation, less memory use, etc.). The disclosed methods, apparatus and articles of manufacture are accordingly directed to one or more improvement(s) in the functioning of a computer.

Example methods, apparatus, systems, and articles of manufacture to provide machine assisted programming are disclosed herein. Further examples and combinations thereof include the following: Example 1 includes an apparatus to provide machine assisted programming, the apparatus including a feature extractor to convert compiled code into a first feature vector, a first machine leaning model to identify a cluster of stored feature vectors corresponding to the first feature vector, and a second machine learning model to recommend a second algorithm corresponding to a second feature vector of the cluster based on a comparison of a parameter of a first algorithm corresponding to the first feature vector and the parameter of the second algorithm.

Example 2 includes the apparatus of example 1, wherein the first machine learning model is to identify the cluster based on a similarity between the first feature vector and the stored feature vectors of the cluster.

Example 3 includes the apparatus of example 1, wherein the first machine learning model is to generate a new cluster for the first feature vector when there is no clusters that are similar to the first feature vector.

Example 4 includes the apparatus of example 1, wherein the first machine learning is trained based on at least one of local libraries, external libraries, internal code, or new code that does not match a cluster.

Example 5 includes the apparatus of example 1, wherein the second machine learning model is to compare efficiency of parameters for algorithms corresponding to stored feature vectors within the cluster.

Example 6 includes the apparatus of example 5, wherein the second machine learning model is to determine the efficiency of the parameters for algorithms corresponding to the stored feature vectors based on documentation corresponding to the algorithms.

Example 7 includes the apparatus of example 5, further including a function executor to execute a third algorithm corresponding to a stored feature, the second machine learning model to determine the efficiency of the parameter for the algorithm based on the execution of the third algorithm.

Example 8 includes the apparatus of example 1, wherein the parameter is selected by a user.

Example 9 includes the apparatus of example 1, wherein the second machine learning model is determined based on context information including at least one of availability of resources or purpose of the compiled code.

Example 10 includes the apparatus of example 1, wherein the recommendation is displayed to a user.

Example 11 includes the apparatus of example 1, wherein the second machine learning model is to update recommendations based on user feedback to the recommendation.

Example 12 includes a non-transitory computer readable storage medium comprising instructions which, when executed, cause a machine to at least convert compiled code into a first feature vector, identify a cluster of stored feature vectors corresponding to the first feature vector, and recommend a second algorithm corresponding to a second feature vector of the cluster based on a comparison of a parameter of a first algorithm corresponding to the first feature vector and the parameter of the second algorithm.

Example 13 includes the computer readable storage medium of example 12, wherein the instructions cause the machine to identify the cluster based on a similarity between the first feature vector and the stored feature vectors of the cluster.

Example 14 includes the computer readable storage medium of example 12, wherein the instructions cause the machine to generate a new cluster for the first feature vector when there is no clusters that are similar to the first feature vector.

Example 15 includes the computer readable storage medium of example 12, wherein the instructions cause the machine to a first machine learning is trained based on at least one of local libraries, external libraries, internal code, or new code that does not match a cluster.

Example 16 includes the computer readable storage medium of example 12, wherein the instructions cause the machine to compare efficiency of parameters for algorithms corresponding to stored feature vectors within the cluster.

Example 17 includes the computer readable storage medium of example 16, wherein the instructions cause the machine to determine the efficiency of the parameters for algorithms corresponding to the stored feature vectors based on documentation corresponding to the algorithms.

Example 18 includes the computer readable storage medium of example 16, wherein the instructions cause the machine to execute a third algorithm corresponding to a stored feature, the second machine learning model to determine the efficiency of the parameter for the algorithm based on the execution of the third algorithm.

Example 19 includes the computer readable storage medium of example 12, wherein the parameter is selected by a user.

Example 20 includes the computer readable storage medium of example 12, wherein the instructions cause the machine to determine a machine learning model based on context information including at least one of availability of resources or purpose of the compiled code.

Example 21 includes the computer readable storage medium of example 12, wherein the recommendation is displayed to a user.

Example 22 includes the computer readable storage medium of example 12, wherein the instructions cause the machine to update recommendations based on user feedback to the recommendation.

Example 23 includes a method to provide machine assisted programming, the method including converting compiled code into a first feature vector, identifying, using a first machine learning model, a cluster of stored feature vectors corresponding to the first feature vector, and recommending, using a second machine learning model, a second algorithm corresponding to a second feature vector of the cluster based on a comparison of a parameter of a first algorithm corresponding to the first feature vector and the parameter of the second algorithm.

Example 24 includes the method of example 23, further including identifying the cluster based on a similarity between the first feature vector and the stored feature vectors of the cluster.

Example 25 includes the method of example 23, further including generating a new cluster for the first feature vector when there is no clusters that are similar to the first feature vector.

Example 26 includes the method of example 23, further including training the first machine learning model based on at least one of local libraries, external libraries, internal code, or new code that does not match a cluster.

Example 27 includes the method of example 23, further including comparing efficiency of parameters for algorithms corresponding to stored feature vectors within the cluster.

Example 28 includes the method of example 27, further including determining the efficiency of the parameters for algorithms corresponding to the stored feature vectors based on documentation corresponding to the algorithms.

Example 29 includes the method of example 27, further including executing a third algorithm corresponding to a stored feature, the second machine learning model to determine the efficiency of the parameter for the algorithm based on the execution of the third algorithm.

Example 30 includes the method of example 23, wherein the parameter is selected by a user.

Example 31 includes the method of example 23, further including training the second machine learning model based on context information including at least one of availability of resources or purpose of the compiled code.

Example 32 includes the method of example 23, wherein the recommendation is displayed to a user.

Example 33 includes the method of example 23, further including updating recommendations based on user feedback to the recommendation. Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to provide machine assisted programming, the apparatus including:
    a feature extractor to convert compiled code into a first feature vector;
    a first machine leaning model to identify a cluster of stored feature vectors corresponding to the first feature vector; and
    a second machine learning model to recommend a second algorithm corresponding to a second feature vector of the cluster based on a comparison of a parameter of a first algorithm corresponding to the first feature vector and the parameter of the second algorithm.

2. The apparatus of claim 1, wherein the first machine learning model is to identify the cluster based on a similarity between the first feature vector and the stored feature vectors of the cluster.

3. The apparatus of claim 1, wherein the first machine learning model is to generate a new cluster for the first feature vector when there is no clusters that are similar to the first feature vector.

4. The apparatus of claim 1, wherein the first machine learning model is trained based on at least one of local libraries, external libraries, internal code, or new code that does not match a cluster.

5. The apparatus of claim 1, wherein the second machine learning model is to compare efficiency of parameters for algorithms corresponding to stored feature vectors within the cluster.

6. The apparatus of claim 5, wherein the second machine learning model is to determine the efficiency of the parameters for algorithms corresponding to the stored feature vectors based on documentation corresponding to the algorithms.

7. The apparatus of claim 5, further including a function executor to execute a third algorithm corresponding to a stored feature, the second machine learning model to determine the efficiency of the parameter for the algorithm based on the execution of the third algorithm.

8. The apparatus of claim 1, wherein the parameter is selected by a user.

9. The apparatus of claim 1, wherein the second machine learning model is determined based on context information including at least one of availability of resources or purpose of the compiled code.

10. The apparatus of claim 1, wherein the recommendation is displayed to a user.

11. The apparatus of claim 1, wherein the second machine learning model is to update recommendations based on user feedback to the recommendation.

12. A non-transitory computer readable storage medium comprising instructions which, when executed, cause a machine to at least:
   convert compiled code into a first feature vector;
   identify a cluster of stored feature vectors corresponding to the first feature vector; and
   recommend a second algorithm corresponding to a second feature vector of the cluster based on a comparison of a parameter of a first algorithm corresponding to the first feature vector and the parameter of the second algorithm.

13. The computer readable storage medium of claim 12, wherein the instructions cause the machine to identify the cluster based on a similarity between the first feature vector and the stored feature vectors of the cluster.

14. The computer readable storage medium of claim 12, wherein the instructions cause the machine to generate a new cluster for the first feature vector when there is no clusters that are similar to the first feature vector.

15. The computer readable storage medium of claim 12, wherein the instructions cause the machine to train a first machine learning model based on at least one of local libraries, external libraries, internal code, or new code that does not match a cluster.

16. The computer readable storage medium of claim 12, wherein the instructions cause the machine to compare efficiency of parameters for algorithms corresponding to stored feature vectors within the cluster.

17. The computer readable storage medium of claim 16, wherein the instructions cause the machine to determine the efficiency of the parameters for algorithms corresponding to the stored feature vectors based on documentation corresponding to the algorithms.

18. The computer readable storage medium of claim 16, wherein the instructions cause the machine to execute a third algorithm corresponding to a stored feature; and
   utilize a second machine learning model to determine the efficiency of the parameter for the algorithm based on the execution of the third algorithm.

19. The computer readable storage medium of claim 12, wherein the parameter is selected by a user.

20. The computer readable storage medium of claim 12, wherein the instructions cause the machine to determine a machine learning model based on context information including at least one of availability of resources or purpose of the compiled code.

21. The computer readable storage medium of claim 12, wherein the recommendation is displayed to a user.

22. The computer readable storage medium of claim 12, wherein the instructions cause the machine to update recommendations based on user feedback to the recommendation.

23. A method to provide machine assisted programming, the method including:
   converting compiled code into a first feature vector;
   identifying, using a first machine learning model, a cluster of stored feature vectors corresponding to the first feature vector; and
   recommending, using a second machine learning model, a second algorithm corresponding to a second feature vector of the cluster based on a comparison of a parameter of a first algorithm corresponding to the first feature vector and the parameter of the second algorithm.

24. The method of claim 23, further including identifying the cluster based on a similarity between the first feature vector and the stored feature vectors of the cluster.

25. The method of claim 23, further including generating a new cluster for the first feature vector when there is no clusters that are similar to the first feature vector.

* * * * *